US006637261B1

(12) United States Patent
Beneker

(10) Patent No.: US 6,637,261 B1
(45) Date of Patent: Oct. 28, 2003

(54) SYSTEM AND METHOD FOR DETERMINING LEAKAGE IN FUEL VAPOR EMISSION CONTROLS

(75) Inventor: Gerrit V. Beneker, Algonac, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/143,258

(22) Filed: May 10, 2002

(51) Int. Cl.[7] ............................................ G01M 15/00

(52) U.S. Cl. ............................................ 73/118.1

(58) Field of Search ............................ 73/118.1, 40, 39, 73/49.7, 714, 49.2, 23.31, 756, 118.2, 46; 123/519, 520

(56) References Cited

U.S. PATENT DOCUMENTS 6,276,193 B1 * 8/2001 Benjey .................... 73/40.5 R

* cited by examiner

*Primary Examiner*—Kamand Cuneo
*Assistant Examiner*—Monica D. Harrison
(74) *Attorney, Agent, or Firm*—Roger A. Johnston

(57) ABSTRACT

A pressure responsive relief valve is disposed in the tank vapor line to the engine inlet manifold and upstream of an electric flow control valve. The pressure responsive valve has a bleed orifice for providing limited flow for leak testing when the relief valve is closed; and, the relief valve is set for opening at a selected pressure differential to provide adequate vapor canister purge flow during engine operation. A differential pressure sensor is employed to read the pressure drop across the bleed orifice during leak testing and the flow determined from a lookup table for comparison with a threshold value to determine if leakage is present in the system.

17 Claims, 4 Drawing Sheets

Bleed orifice restriction

SYSTEM AND METHOD FOR DETERMINING LEAKAGE IN FUEL VAPOR EMISSION CONTROLS

BACKGROUND OF THE INVENTION

The present invention relates to systems employed for controlling the emission of vapors from a vehicle fuel tank and particularly such systems as employed on light trucks and passenger cars.

Mandated regulations for controlling vehicle on-board fuel vapor emission require that the vapor from the fuel tank vent system be stored during periods of engine in operation; and, it is thus necessary to purge the stored vapors during engine operation in order for the vapor emission control system to continue to function for its intended purpose. It is thus necessary to maintain the integrity of the components of the emission control system over the service life of the vehicle and to prevent leakage of fuel vapor from the system.

Heretofore, a known system for controlling fuel tank vapor emission, as shown in FIG. 2, has included a storage device 1 connected to receive fuel vapor directly through a conduit from the fuel tank 2, with the storage device or canister 1 having an atmospheric purge inlet 3 which may be opened or closed by a control valve 4 connected to an electronic controller 5. The fuel tank has a tank pressure sensor 6 connected to sense the internal pressure in the tank which sensor provides an electrical input to the electronic control unit 5.

The canister has a vapor outlet line 7 connected to provide vapor flow through a control orifice 8 with the downstream side of orifice 8 connected to the inlet of a flow control valve 9 which has its outlet connected to the combustion air inlet or intake manifold of an engine 10. Flow control valve 9 is an electrically operated valve controlled by the electronic control unit 5.

An electrically operated normally open valve 11 is connected to bypass the orifice 8 and is also controlled by the electronic control unit 5. A differential pressure sensor 12 is connected to sense the pressure drop across the orifice 8; and, pressure sensor 12 provides an electrical input signal to the electronic controller 5.

In operation, for performing leak tests, it is necessary for the controller 5 to close the atmospheric vent valve 4 and the bypass valve 11 before any leak tests can be performed. The flow control valve 9 is then modulated to provide a predetermined negative gauge pressure or vacuum in the tank, as sensed by the tank pressure sensor 6; and, the pressure sensed by the differential pressure sensor 12 is read. The flow through orifice 8 may then be determined from lookup tables and the flow rate compared with a threshold value to determine if the flow is in excess of the threshold and therefore that leakage exists.

The above-described known system thus requires not only a vapor management valve in the form of flow control valve 9 but also a separate electrically controlled bypass valve 11 which must be actuated in order to perform the leakage test. This arrangement has thus been costly to implement in high volume production of light motor vehicles and it has therefore been desired to provide a simpler more cost effective way of providing a fuel tank vapor emission system and leak testing same.

BRIEF SUMMARY OF THE INVENTION

The present invention provides a low cost, simple and reliable system and method for performing a diagnostic leak test on a fuel tank vapor emission control system as employed in motor vehicles. The arrangement of the present invention provides a pressure relief valve having a bleed orifice formed therein which is disposed in the line from the vapor storage canister to the electric valve controlling flow of fuel vapor to the engine combustion air inlet,. A differential pressure sensor is disposed to sense the pressure drop across the pressure relief valve when closed; and, a tank pressure sensor provides tank pressure data for the test. An electronic controller closes the atmospheric air inlet valve to the canister, modulates the vapor flow to the engine air inlet to provide a desired tank pressure for conducting the test. The differential pressure sensor then provides pressure data to the controller from which flow to the bleed orifice may be determined by comparison with differential pressure values for known flows from a lookup table. The computed flow may then be compared with a threshold value to determine whether leakage exists.

The present invention thus provides a unique and novel leak test system which eliminates the need for a separate electrically operated bypass control valve for the flow measuring orifice.

DETAILED DESCRIPTION OF THE INVENTION

Figure 2:
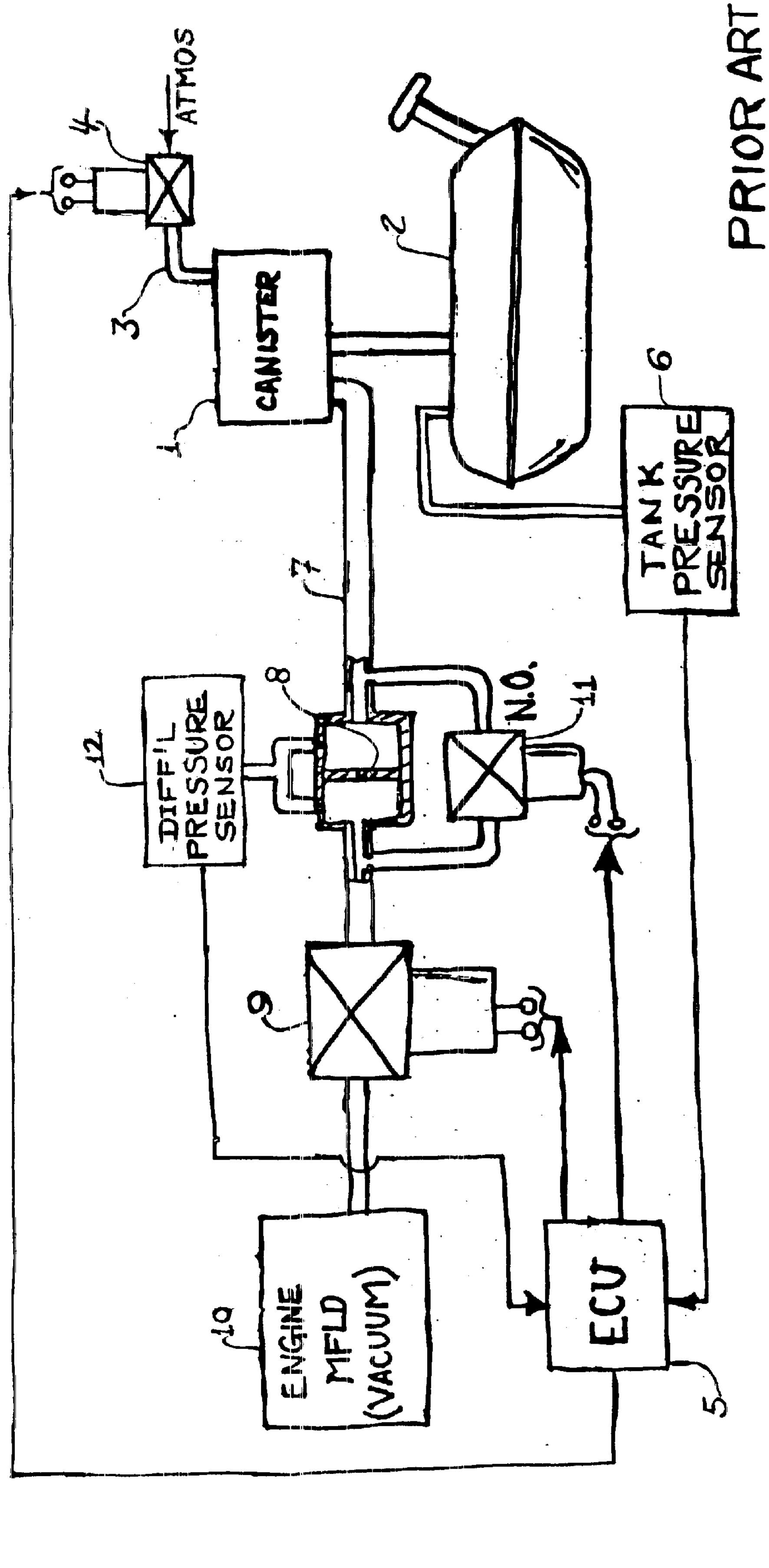
PRIOR ART FIG. 2
FIG. 2 is a view similar to FIG. 1 of the prior art systems.
Figures 3, 4:
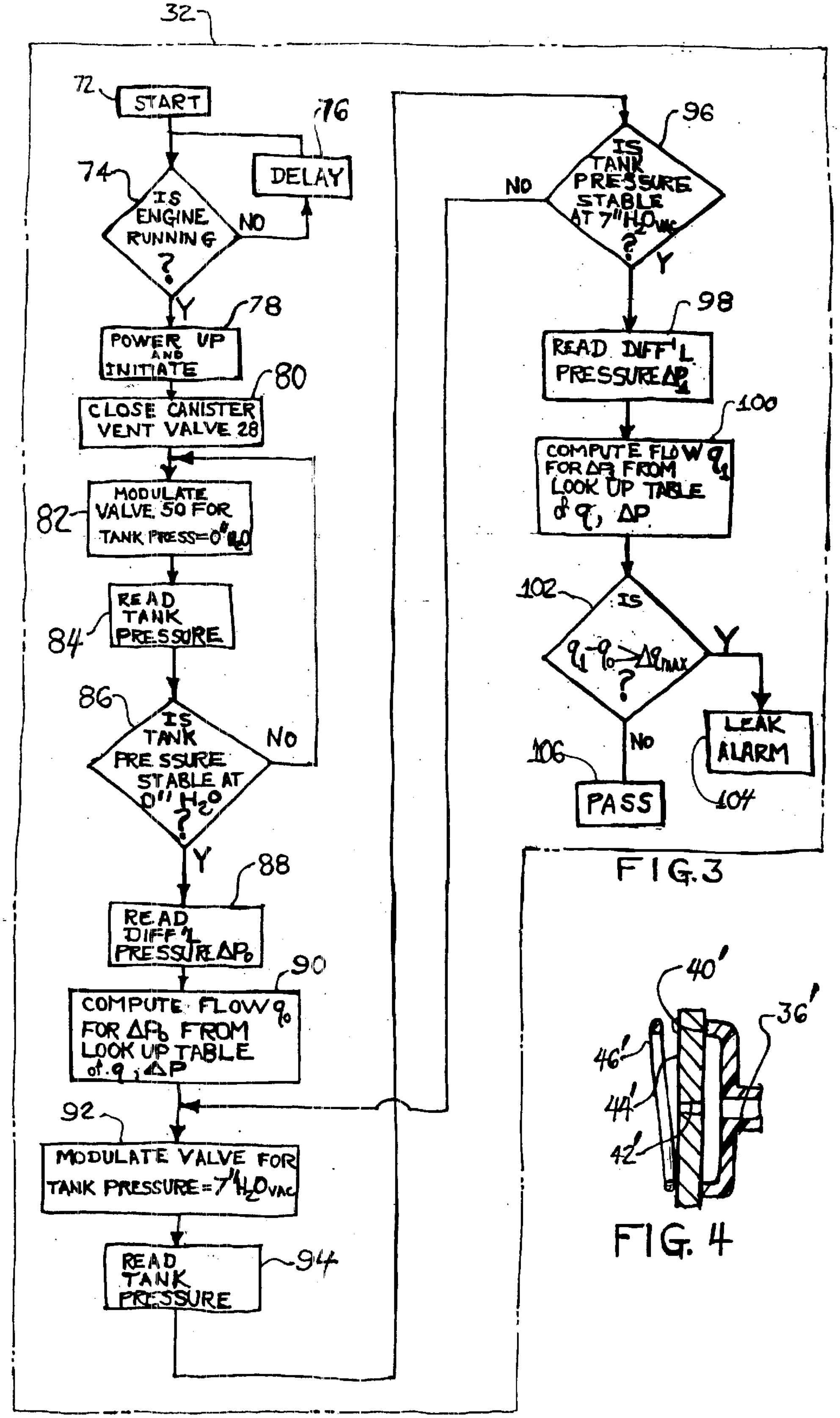
FIG. 3 is a flow diagram for the controller of the system of FIG. 1.
FIG. 4 is an enlarged view of a portion of FIG. 1 showing an alternate embodiment of the pressure relief valve; and, FIG. 5 is a graph of values of flow q plotted as a function of pressure drop $\Delta P$ measured across the bleed orifice.

Referring to FIGS. 2 and 3, the system of the present invention is indicated generally at 20 and has a storage device in the form of canister 22 connected to fuel tank 24 by a conduit 26, typically a flexible hose. The canister has an atmospheric inlet with an electrically operated shutoff valve 28, which valve is controlled along line 30 by an electronic control unit (ECU) denoted by reference numeral 32.

Canister 22 has a vapor outlet line 34 which is connected to the inlet 36 of a pressure responsive valve indicated generally at 38. Valve 38 has an annular valve seat 40 formed therein which communicates with the inlet 36 and which has a bleed orifice 42 formed therein. A moveable valve member 44 is registered against the valve seat 40 and biased thereagainst by a spring 46. The outlet of the valve 38 is connected via conduit 48 to the inlet of an electrically operated flow control valve 50 which has its outlet connected along line 52, which may be a flexible hose, to the combustion air inlet of an engine denoted at reference numeral 54. Valve 50 is connected along line 56 to receive control signals from the ECU 32.

A pressure tap line 58 is connected to the inlet 36 of valve 38; and, the pressure tap 58 is connected to a differential pressure sensor 60 which is also connected through a pressure tap line 62 to the outlet conduit 48 of the valve 38. The differential pressure sensor 60 provides an electrical signal along line 64 to the ECU 32, which signal is indicative of the differential pressure measured across the valve 38 when closed and thus senses the pressure drop across bleed orifice 42.

Figure 1:
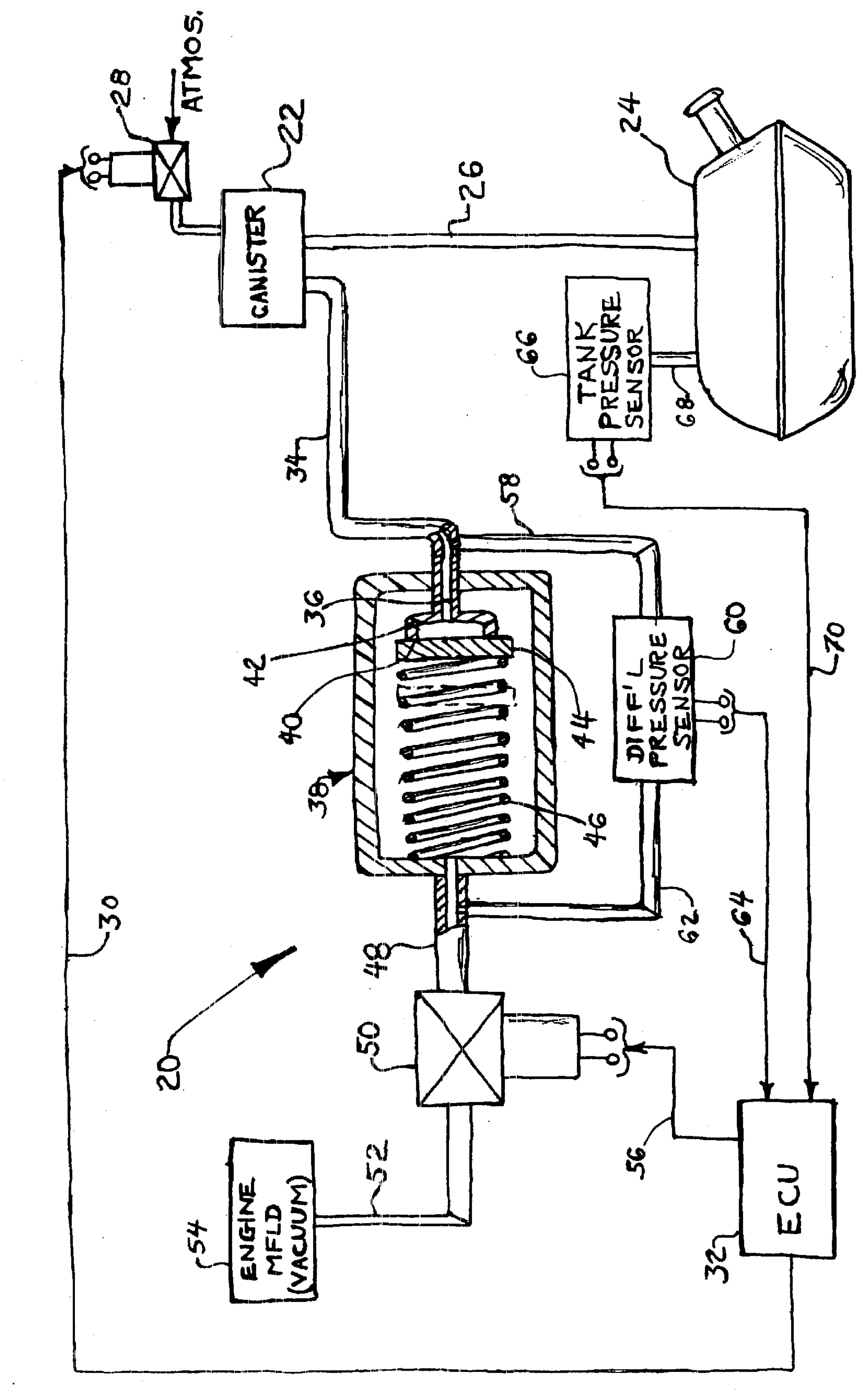
FIG. 1 is a pictorial schematic of the leak testing system for a fuel tank vapor control system employing the present invention.

The moveable valve member 44 is raised from the annular valve seat 40 when a pressure differential above a certain threshold, exists across the valve 38. In the present practice of the invention, it has been found satisfactory to set the threshold differential pressure at ten inches (254 mm) indicated column of $H_2O$. The open position of the valve member 44 is indicated in dashed outline in FIG. 1.

A tank pressure sensor 66 is connected through a conduit 68 to the fuel tank 24; and, tank pressure sensor 66 provides an electrical signal output along line 70 to the ECU 32.

Referring to FIG. 4, an alternative arrangement of the valve 38 is shown wherein the inlet 36' is connected to valve seat 40' which has a moveable valve member 44' registered thereagainst with a bleed orifice 42' formed through the valve member 44' which is biased by a spring 46'.

Referring to FIG. 3, the operational program of the ECU 32 is indicated by a block flow diagram, wherein the system upon power-up or Start at step 72 proceeds to query at step 74 as to whether the engine is running; and, if not, recycles through an appropriate Delay at step 76.

Referring to FIG. 3, if the engine is running the diagnostic system powers up and proceeds to initiate at step 78 and proceeds to step 80 where the atmospheric vent valve 28 is closed. The system then proceeds to modulate the flow control valve 50 at step 82 until the tank pressure read at step 84 equals zero inches $H_2O$ column. The system then proceeds to ask at step 86 whether the tank pressure is maintained at the zero inches indicated column of $H_2O$; and, if not, the system returns to step 82. However, if the tank pressure is stable at zero inches indicated column of $H_2O$, the system proceeds to step 88 and reads the output $\Delta P_0$ of the differential pressure sensor 60.

Figure 5:
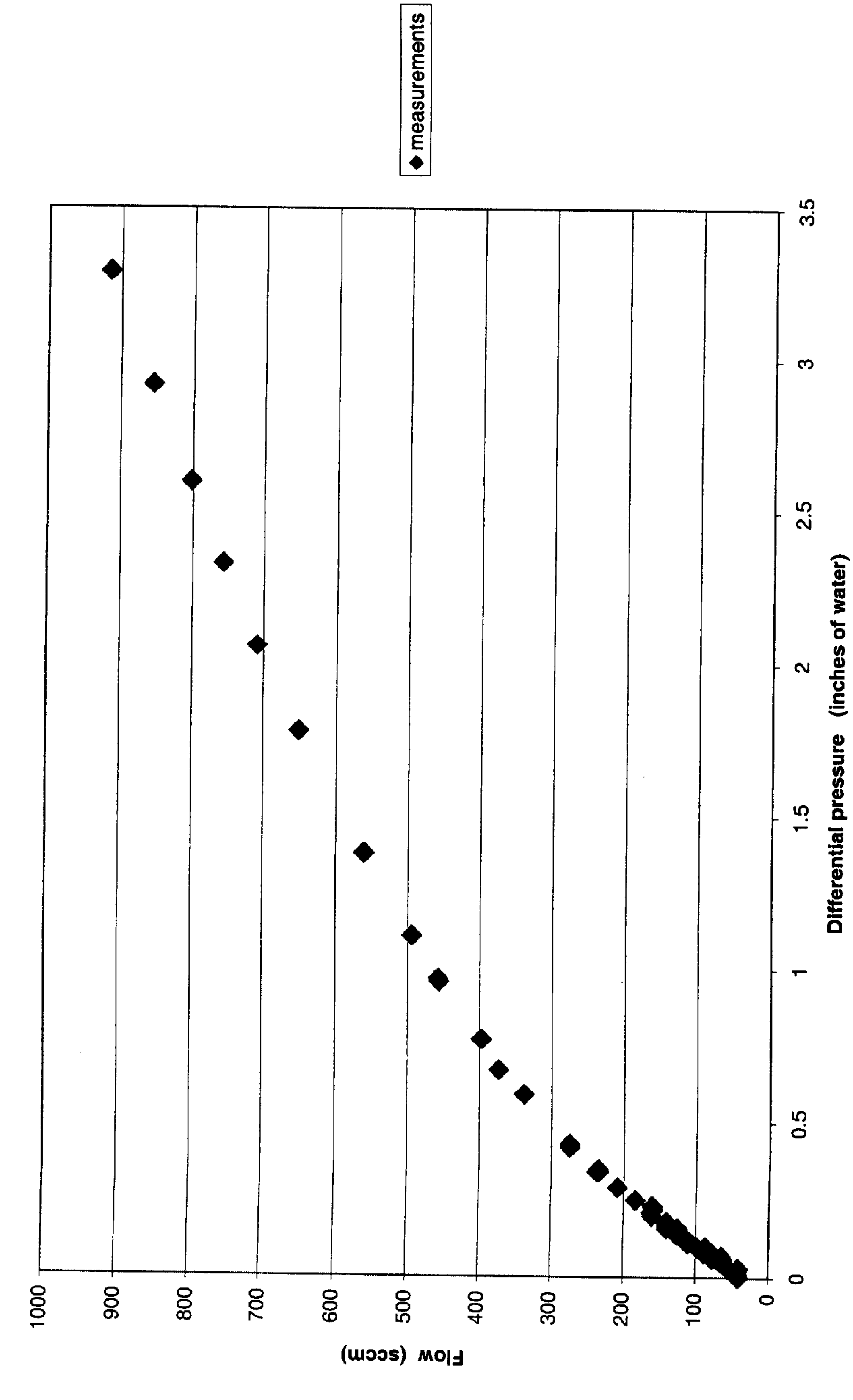

The system then computes the flow $q_0$ for $\Delta P_0$ from a lookup table of flow q versus ΔP, which table may be made from data taken from the flow curve in FIG. 5.

The system then proceeds to step 92 and modulates the valve 50 for maintaining a tank pressure of seven inches (178 mm) indicated column of $H_2O$ as read at step 94. The system then proceeds to step 96 and inquires as to whether the tank pressure is stable at seven inches (178 mm) column of $H_2O$; and, if not, the system returns to step 92.

However, if the tank pressure is stable at step 96, the system proceeds to step 98 and reads the differential pressure $\Delta P_1$, output of the pressure sensor 60 and proceeds to step 100 to compute the flow $q_1$ for $\Delta P_1$ from a lookup table of values of q and ΔP which table may be generated by the flow data from FIG. 5.

The system then proceeds to step 102 and asks whether the difference in flow as $q_1-q_0$ is greater than a predetermined Δq max; and, if the answer is affirmative, the system proceeds to provide a Leak Alarm indication at step 104. However, if the flow $q_1-q_0$ is less than the predetermined threshold q max the system proceeds to indicate no leak at step 106.

It will be understood that the values of zero inches of water (178 mm) indicated column of $H_2O$ are chosen for convenience to provide significant signal output of sensor 60; and, other values less than ten inches (254 mm) may be chosen.

The present invention thus provides a unique and novel leak detection method and system for determining if a fuel tank vapor emission control system is leaking into the atmosphere and utilizes a pressure responsive valve to provide, when closed a bleed orifice for providing measured flow during leak testing, but permits the valve to open for normal vapor purge functions when the engine is in operation and therefore eliminates a separate electrically controlled bypass valve requiring activation before leak testing can be performed.

Although the invention has hereinabove been described with respect to the illustrated embodiments, it will be understood that the invention is capable of modification and variation and is limited only by the following claims.

What is claimed is:

1. A method of detecting leaks in a fuel tank vapor emission control system comprising:

(a) connecting a first vapor line from the tank to a vapor storage device;

(b) connecting a second vapor line for allowing fuel vapor flow to an engine air inlet and disposing an electrically operated flow control valve in said second vapor line;

(c) disposing a pressure relief valve in said second vapor line between said electrically operated valve and said tank and forming a flow limiting bleed orifice through said pressure relief valve and permitting limited bleed flow through the valve when closed;

(d) opening the pressure relief valve when the pressure differential thereacross reaches a predetermined level;

(e) modulating said electrically operated valve and sensing tank pressure and generating an electrical signal indicative thereof;

(f) sensing the pressure differential across said pressure relief valve and determining flow from known values of flow verses pressure differential; and, (g) determining leakage from said tank pressure signal and said determined flow.

2. The method defined in claim 1, wherein the step of disposing a pressure relief valve includes disposing a valve having a flat plate valve member closeable against an annular valve seat and the step of forming a bleed orifice includes forming an orifice in the flat plate.

3. The method defined in claim 1, wherein the step of disposing a pressure relief valve includes disposing a valve having a flat plate valve member closeable against an annular valve seat and biasing the flat plate with a spring to the closed position.

4. The method defined in claim 1, wherein the step of sensing the pressure differential includes controlling said electrically operated valve in response to the tank pressure.

5. The method defined in claim 1, wherein said step of sensing the pressure differential includes modulating said electrically operated valve and maintaining a predetermined tank pressure.

6. The method defined in claim 1, wherein said step of connecting a first vapor line to a storage device includes connecting an electrically operated atmospheric vent valve to the storage device.

7. The method defined in claim 6, wherein said step of sensing tank pressure includes closing said atmospheric vent valve.

8. A method of detecting leaks in a fuel tank vapor emission control system comprising:

(a) connecting a first vapor line from the tank to a vapor storage device and connecting an atmospheric vent valve to the storage device;

(b) connecting a second tank vapor line to the inlet of a normally closed pressure responsive valve operable to open in response to a predetermined pressure differential thereacross and forming a bleed passage in the valve and permitting bleed flow therethrough when the valve is closed;

(c) connecting the outlet of the pressure responsive valve through a flow control valve to the combustion air inlet of an engine;

(d) closing said atmospheric vent valve and connecting a pressure sensor across the inlet and outlet of the pressure responsive valve and sensing the pressure differential resulting from flow through the bleed passage;

(e) sensing tank pressure and providing an electrical indication thereof;

(f) modulating the flow control valve to provide a predetermined tank pressure;

(g) reading the sensed differential pressure at said predetermined tank pressure and determining the flow at said differential pressure; and, (h) providing an indication if said flow exceeds a certain threshold.

9. The method defined in claim 8, wherein said step of connecting through a flow control valve includes connecting through an electrically operated valve.

10. The method defined in claim 9, wherein said step of connecting through an electrically operated flow control valve and sensing pressure differential includes sensing with a pressure transducer and controlling the electrically operated flow control valve in response to the output of the transducer.

11. The method defined in claim 9, wherein said step of connecting through an electrically operated valve includes connecting through a solenoid operated valve.

12. The method defined in claim 8, wherein said step of connecting a second vapor line includes connecting to the inlet of a valve having a spring biased flat disc valving member closeable on an annular valve seat.

13. The method defined in claim 1, wherein said step of forming a bleed passage includes forming an orifice in the flat disc valving member.

14. A system for detecting leaks in vapor emission controls for a fuel tank comprising:

(a) a storage device connected to receive fuel vapor from the tank including a closeable atmospheric vent;

(b) a normally closed pressure responsive relief valve having the inlet thereof connected to receive fuel vapor from the tank, and including a bleed passage permitting bleed flow when the valve is closed;

(c) a pressure sensor connected to sense the tank pressure;

(d) an electrically operated flow control valve having the inlet thereof connected for receiving vapor from the outlet of said pressure responsive relief valve, and the outlet thereof connected to the combustion air inlet of an engine, wherein said electrically operated valve is controlled in response to said sensed tank pressure;

(e) a differential pressure sensor connected between the inlet and the outlet of the pressure responsive relief valve;

(f) circuit means operable to compute flow from output of the differential pressure sensor at a certain tank pressure with said atmospheric vent closed; and, (g) means for indicating said computed flow exceeds a certain threshold.

15. The system defined in claim 14, wherein said pressure sensor includes a pressure transducer with an electrical output indicative of the sensed pressure difference.

16. The system defined in claim 14, wherein said pressure responsive relief valve includes a flat disc moveable valve member.

17. The system defined in claim 16, wherein said bleed passage comprises an orifice in said flat disc.

* * * * *